United States Patent [19]

Lenert et al.

[11] Patent Number: 5,003,718
[45] Date of Patent: Apr. 2, 1991

[54] GAME BIRD DECOYS

[76] Inventors: Steven A. Lenert, 3506 Woodleaf Dr., Shreveport, La. 71118; Robert D. Berkley, 29 Echo Ridge, Haughton, La. 71037

[21] Appl. No.: 349,946

[22] Filed: May 8, 1989

Related U.S. Application Data

[63] Continuation-in-part of Ser. No. 7/115,812, Nov. 2, 1987, abandoned.

[51] Int. Cl.⁵ .............................................. A01M 31/06
[52] U.S. Cl. ........................................................ 43/3
[58] Field of Search .................... 43/3, 2; 446/92, 177, 446/385, 390, 397

[56] References Cited

U.S. PATENT DOCUMENTS

| | | | |
|---|---|---|---|
| 1,923,442 | 8/1933 | Kilgore | 43/3 |
| 1,923,442 | 8/1933 | Kilgore | 43/3 |
| 2,495,720 | 1/1950 | Heymann | 43/3 |
| 2,651,873 | 9/1953 | Risch et al. | 43/3 |
| 2,755,588 | 9/1956 | Johnson | 43/3 |
| 2,839,788 | 6/1958 | Dembiak | 446/385 |
| 3,509,656 | 5/1970 | Woolworth | 43/3 |
| 3,798,820 | 3/1974 | Dye | 43/3 |
| 3,800,457 | 4/1974 | Barrett | 43/3 |
| 4,023,297 | 5/1977 | Jorgensen | 43/3 |
| 4,073,397 | 2/1978 | Snodgrass | 43/3 |
| 4,539,772 | 9/1985 | Forbes et al. | 43/3 |
| 4,590,699 | 5/1986 | Nicks | 43/2 |
| 4,607,447 | 8/1986 | Wright | 43/2 |
| 4,691,463 | 9/1987 | DeKezel et al. | 43/3 |
| 4,821,444 | 4/1989 | Remus | 43/2 |

*Primary Examiner*—Richard K. Seidel
*Assistant Examiner*—Chuck Y. Mah
*Attorney, Agent, or Firm*—Berman, Aisenberg & Platt

[57] ABSTRACT

A game bird decoy is formed as a shell representative of the upper portion that is above the waterline of a floating game bird represented. There is an open cavity below the upper portion that terminates in a waterline rim. The head is formed folded out with two similar sides to be folded together and bonded to yield a realistic head. The head is attached to the body by inserting the neck into a hole provided in the body shell. A slit in the neck provides access to the cavity within for storage of line, weight, and the like. The decoy is formed from flat sheet stock of closed cellular foam, preferably, of polyethelene. The color and color patterns as desired on the final product are applied to the flat sheet stock before vacuum forming. Painting, printing and silk screen processes are used as dictated by batch quantity considerations.

14 Claims, 2 Drawing Sheets

GAME BIRD DECOYS

This application is a continuation-in-part of U.S. application Ser. No. 07/115,812 filed on Nov. 2, 1987, now abandoned.

This invention pertains to decoys and their manufacturing processes. Primary interest pertains to waterfowl decoys.

BACKGROUND

Decoys have been in the art for many years. Originally, decoys were carved from wood and considerable effort was made to produce realistic representations of the species of interest. One dozen decoys were often carried by a hunter to the use area and recovered for storage and subsequent use. The volume and weight was a considerable burden to the hunter. Evolving art dealt primarily with alternate light weight materials. Removable heads, with storage cavities within the decoy bodies followed. Eventually, inflatable decoys were tried. Inflatable decoys require little storage space and weigh much less but they do not float naturally unless ballasted and they require blowing up and subsequent deflation. One stray shot pellet can reduce the decoy to uselessness and possibly result in it's loss.

Hunters expect the game birds to see only the upper profile of decoys and they rarely have an opportunity to examine the underside. It has been found that decoys that rest on a water or land surface do not need an underside. It has further been found that decoys with a waterline rim become rather stable and resistant to wind and small wave upsetting. The stability appears to result from a suction cup effect of the rim on the water.

Materials currently available are flexible and have a good elastic memory. Such materials can be folded, rolled or otherwise distorted for transport and storage yet assume the original three dimension effect when restraints are released. Expanded foam material is available in sheet form that will deform into a mold with the application of heat and vacuum. Such materials can be painted or printed with the general background color of the species represented. Subsequent selective touch-up with silk screen processes can add the male-female and family characteristics desired, all of the coloring and pattern work can be done while the sheet stock is flat. The subsequent formed material will have the details where needed after forming.

It is therefore an object of this invention to provide game bird decoys with an upper profile representative of the species of interest with a rim suitable for surface resting of the decoy, and an open underside.

It is another object of this invention to provide game bird decoys having an upper three dimensional configuration, with an open underside that is formed of material that is flexible enough to be collapsed for transport and storage yet return to the original form when restraints are released.

It is still a further object of this invention to provide game bird decoys that have an upper three dimension profile and an opening into which a head can be installed and positioned selectively for use.

It is still another object of this invention to provide game bird decoys made from flat material that has the selected color patterns on the sheet stock before forming into three dimension shapes.

It is still another object of this invention to provide game bird decoys that have flexible, removable, heads that can be deformed for transport and storage.

These and other objects, advantages and features will be apparent to those skilled in the art from consideration of the specification, including the attached claims and appended drawings.

SUMMARY OF THE INVENTION

A game bird decoy is made of flexible material that can be deformed for transport and storage and will resume the desired three dimension shape when restraints are removed. The body has only an upper three dimension shape with a rim to rest on a selected surface A hole is provided in the body into which the neck can be inserted to support the head in selected positions. The head is hollow and flexible. An opening in the neck makes the hollow in the head available for storage of mooring line and anchor weight. The decoy, preferably, is colored and patterned while in flat stock form. The flat stock is vacuum formed to the desired three dimension shape with the color pattern in the selected location on the final product. The preferred material of construction is closed cellular foam sheet stock of polyethylene.

DETAILED DESCRIPTION OF DRAWINGS

Figure 1:
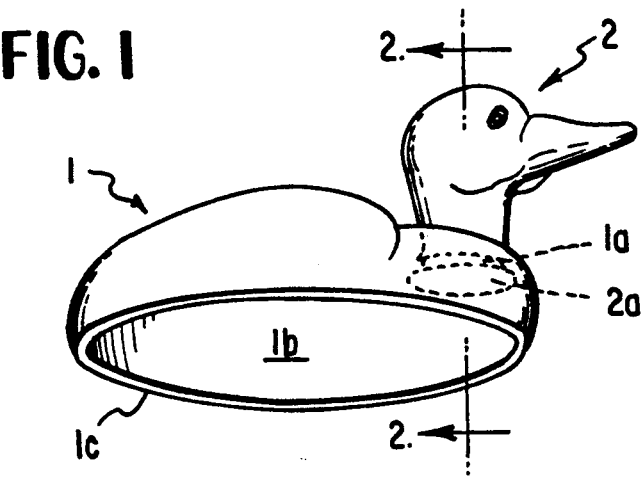
FIG. 1 is a side view of the assembled decoy of the invention, in the form of a duck.

In the drawings wherein like features have like captions, FIG. 1 shows an assembled decoy with body 1 formed as an upper representation, in shell form, of the bird of interest, with an open cavity 1b on the underside and rim 1c defining the lower dimension. This may be called a waterline rim. Neck hole 1c accepts the neck of head Z. The head can be rotated in the neck hole for selective positioning. Both head and body are, preferably, formed of closed cellular foam polyethylene.

Figure 2:
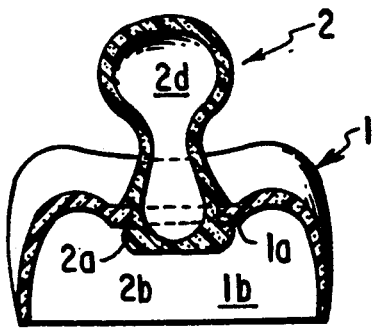
FIG. 2 is a section taken along line 2—2 of FIG. 1.

FIG. 2 is a section taken along line 2—2 of FIG. 1. The head is shown to be hollow with cavity 2d formed therein. A slit 2b in the bulb end 2a allows mooring lines and anchor weights to be stored in the head for transport and storage of the decoy. The neck will swivel in hole 1a and has sufficient elastic interference therein to firmly hold the head in selected positions. In use, the decoy usually rests on the rim in water. The preferred material of construction does not soak up water. Cavity 1b apparently has a suction cup effect on the water and is not disturbed by light wind and small waves.

Figure 3:
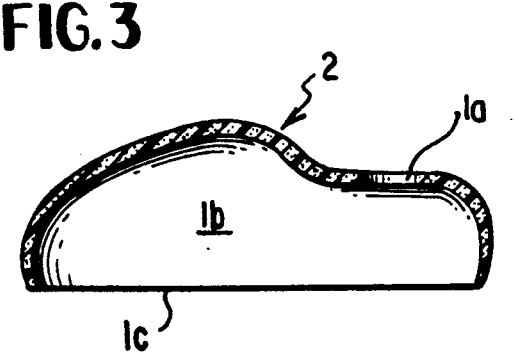
FIG. 3 is a section of the decoy body taken along the plane of symmetry.

FIG. 3 shows the decoy body, as formed as one piece and requires no subsequent fabrication steps.

Figure 4:
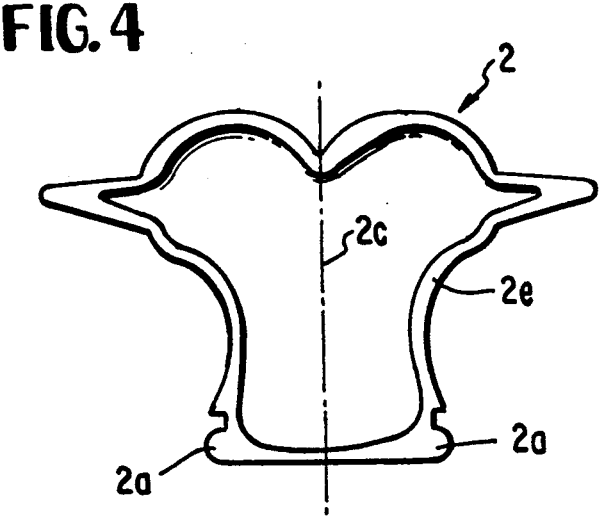
FIG. 4 is a plan view of the decoy bead as formed before the final fabrication step.

FIG. 4 shows the head as molded. The two complementary sides are to be folded along a line of symmetry, line 2c in this case, to bring bond surfaces 2e into contact for bonding to complete the head. The result is a three dimensional head quite representative of the game bird of interest.

Figure 5:
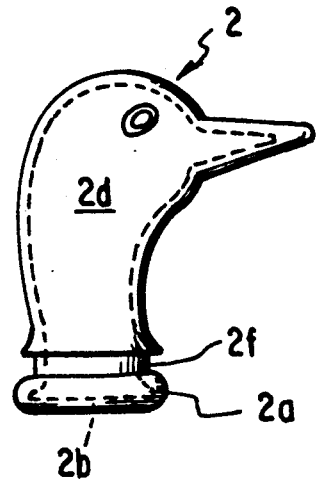
FIG. 5 is a section through the decoy head after it is folded and bonded to the final shape.

FIG. 5 is a section taken through the head to show cavity 2d that exists once the head is folded and bonded. Slit 2b is cut, or left unbonded, to provide access to the cavity 2d for storing the like of string and weight. Ferrule 2f is a length of the neck that is approximately cylindrical to best function in the hole 1a in the body. Bulb 2a is larger in diameter than the ferrule. It is squeezed through hole 1a and provides stability to the fit of the ferrule in the hole 1a.

The decoy of this invention is one well adapted to be formed by a unique combination of common processes.

A variety of decoy heads may be used with the unique body of this invention, including wood and plastic, or others, but the preferred head is formed by the process defined herein.

Both body and head may be formed by the common heat and vacuum application to draw sheet stock into a mold. The term "vacuum" is just one expression for the application of a pressure gradient across the sheet stock to drive it into a mold cavity.

Figure 6:
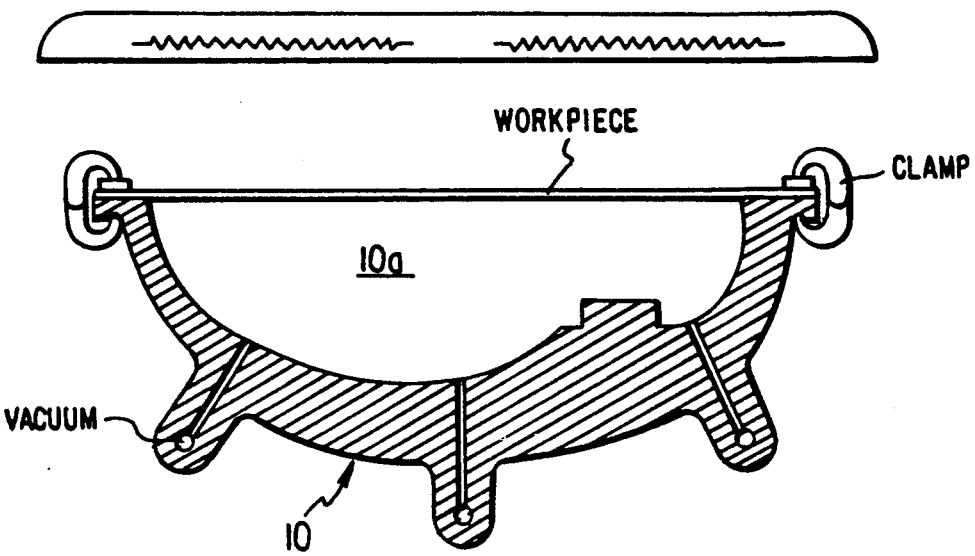
FIG. 6 is a sectional view, cut by a plane of symmetry, of a well known vacuum forming arrangement.

FIG. 6 shows mold 10 with cavity 10a that has the prepared shape of the product desired, in the case of the head. The desired shape requires one more folding step as described previously herein to achieve the final product shape. The body requires only trimming to the final product shape.

The preferred process utilizes sheet material that has the desired color pattern applied before the vacuum forming step. The color pattern on the sheet stock has such distribution that the color characteristics will be drawn into the mold cavity to arrive at the selected profile for selected color locations.

In general, the selected species background colors and patterns can be touched up by silk screen processes to highlight certain feather patterns and neck and head patterns to yield selected gender and family characteristics. In some cases, the entire color pattern process is applied by silk screen. The selected process, painting, printing and silk screen processes are selected after consideration of the quantity of similar features to be produced.

The material for the decoy is soft, flexible material with an elastic memory which enables it to be folded, rolled, or otherwise distorted for transport and/or storage, and then allows it to assume its original three-dimensional shape when the decoy is unfolded or unrolled or the restraints are otherwise removed. Suitable materials are thermoformable and can spring back into the original configuration once released from folded position. Any thermoformable material with a good memory which can be folded and which then springs back into its original shape after release of restraints may be used.

Preferred materials are polyolefin foams, such as polyethylene foam or polypropylene foam. Polyvinylchloride foam may also be used. EVA (ethylene vinylacete) foam is also suitable. foams used for decoys of the invention are closed cell foams of density less than 12 lb. per cu. ft. The decoys are formed of foam sheets generally between about ⅛ in. and ½ in. in thickness which is thermoformed into the desired shape.

The material used for the decoys may be unfoamed. Thermoformable vinyl sheet material having a good elastic memory after thermoforming, which enables it to spring back into its original shape after restraints imposed upon folding are released, is also suitable. Such sheet material preferably has a density greater than 12 lb. per cu. ft. and a thickness between about 1/16 in. and ⅛ in.

Figure 7:
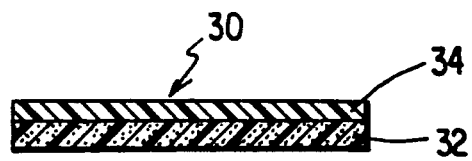
FIG. 7 is a cross-sectional view of a laminate useful for making decoys of the invention.

The material used for the decoys may optionally be laminated with other materials, such as film or fabric, on the inner and/or outer surfaces of the decoy. FIG. 7 shows a laminate 30, suitable for making decoys of the invention, in which foam layer 32 is laminated to film layer 34. Film layer 34 is, for example, a pre-printed sheet of oriented polypropylene or other film, or a fabric such as nylon, which has been pre-printed with the colored pattern to be used on the outside of the decoy, representing a game bird. When the outer film has the appearance of a game bird, the step of coloring the decoy can be eliminated. Foam layer 32 and film layer 34 are laminated together and then thermoformed. Alternatively, if compatible materials are used, for example, if film sheet 34 is extruded flexible vinyl sheet material and foam sheet 32 is vinyl foam, sheets 32 and 34 can be placed in the mold together and laminated and thermoformed in a single step.

Figure 8:
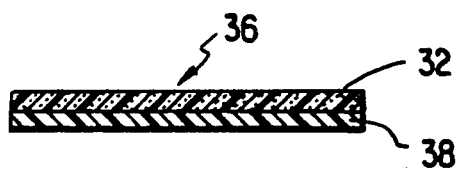
FIG. 8 is a cross-sectional view of another laminate useful for making decoys of the invention.

FIG. 8 shows an example of laminate 36 in which foam layer 32 is laminated to a film or fabric layer 38 which forms the inner surface of the concave shell of the game bird decoy. Layer 38 may, for example, be a flexible thermoformable sheet of extruded vinyl or a fabric sheet such as nylon.

Figure 9:
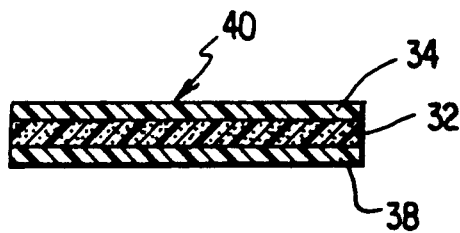
FIG. 9 is a cross-sectional view of a further laminate useful for making decoys of the invention.

FIG. 9 shows a further laminate of the invention in which the decoy is made from a laminate in which inner and outer surfaces are laminated to a middle layer of flexible, thermoformable foam or sheet material. Foam or sheet material 32 is laminated to inner layer 38, which may be a film or fabric, as discussed with respect to FIG. 8, and to film layer 34, which may be a pre-printed sheet, as discussed with respect to FIG. 7.

Combinations of layers of thermoformable materials which may be colored and laminated in one step are preferred.

If a laminate is used for the body of the game bird decoy, the thickness of the foam may be reduced to between ¼ in. and ⅛ in., since the layer(s) laminated to the surface(s) of foam or sheet layer 32 add strength.

These examples are non-limiting examples of suitable flexible materials which have good elastic memory and which regain their original shape after restraints, such as folding, are released. Other materials with similarly good elastic memory may be used. The decoys of the invention are light in weight, flexible and foldable, regain their shape, and are formed into a buoyant, soft decoy body which may be stacked.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawings is to be interpreted as illustrative and not in a limiting sense.

The invention having been described, we claim:

1. A game bird decoy comprising:
    a buoyant open concave shell comprising soft, flexible foam sheet material, said soft, flexible sheet material being foldable and deformable and able to regain its original shape upon release of restraints after being deformed, said shell representing an upper body portion of a game bird including an inner concave surface having a continuous circumferential lower edge extending around the shell at the position of the waterline when the game bird being simulated is sitting in the water, wherein the concave decoy body is open to the water within said circumferential lower edge, and
    an outer substantially convex surface of the open concave shell, said convex surface molded to simulate the upper body portion of a game bird.

2. A game bird decoy according to claim 1 further comprising a head portion representing the head of the game bird being simulated, said head portion being engaged with the concave shell to simulate a game bird.

3. A game bird decoy according to claim 1 further comprising an opening in an upper portion of the shell for receiving a head portion of the decoy.

4. A game bird decoy according to claim 3 further comprising a head portion having a neck portion engaged in said opening.

5. A game bird decoy according to claim 1 wherein said soft foam sheet comprises closed cell foam.

6. A game bird decoy according to claim 5 wherein said closed cell foam sheet comprises polyethylene.

7. A game bird decoy according to claim 1 wherein the soft, flexible sheet material comprises foam sheet material.

8. A game bird decoy according to claim 7 wherein the foam sheet material comprises polyolefin foam sheet material.

9. A game bird decoy according to claim 1 wherein the soft, flexible sheet material comprises vinyl sheet material.

10. A game bird decoy according to claim 1 wherein said sheet material further comprises a layer of thermoformable material laminated to an outer side of said sheet material.

11. A game bird decoy according to claim 1 further comprising a layer of thermoformable material laminated to an inner side of said sheet material.

12. A game bird decoy according to claim 10 further comprising a layer of thermoformable material laminated to an inner side of said sheet material.

13. A game bird decoy according to claim 10 wherein the layer of thermoformable material is colored to represent an outer surface of the game bird.

14. A game bird decoy comprising:
    a buoyant open concave shell comprising soft, flexible closed cell polyethylene foam sheet material, said material being foldable and deformable and able to regain its original shape when restraints are released, said shell representing an upper body portion of a game bird including an inner concave surface having a continuous circumferential lower edge extending around the shell substantially at the position of the waterline when the game bird being simulated is sitting in the water, wherein the concave decoy upper body portion is open to the water within said circumferential lower edge, and
    an outer substantially convex surface of the open concave shell, said convex surface molded to simulate the outer upper body portion of a game bird, and
    means in an upper portion of the concave shell for receiving a head portion of the decoy.

* * * * *